(12) United States Patent
Matsumura et al.

(10) Patent No.: US 11,772,585 B2
(45) Date of Patent: Oct. 3, 2023

(54) WIRING SYSTEM FOR AUTOMOBILE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Yutaka Matsumura, Mie (JP); Akio Ishihara, Mie (JP); Shinya Itou, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 221 days.

(21) Appl. No.: 17/278,794

(22) PCT Filed: Aug. 26, 2019

(86) PCT No.: PCT/JP2019/033331
§ 371 (c)(1),
(2) Date: Mar. 23, 2021

(87) PCT Pub. No.: WO2020/071007
PCT Pub. Date: Apr. 9, 2020

(65) Prior Publication Data
US 2022/0396222 A1  Dec. 15, 2022

(30) Foreign Application Priority Data
Oct. 3, 2018  (JP) ................ 2018-188545

(51) Int. Cl.
*B60R 16/03* (2006.01)
*H04L 12/40* (2006.01)

(52) U.S. Cl.
CPC ........ *B60R 16/03* (2013.01); *H04L 12/40182* (2013.01)

(58) Field of Classification Search
CPC ................ B60R 16/03; H04L 12/40182
(Continued)

(56) References Cited

U.S. PATENT DOCUMENTS

| 5,888,088 A | 3/1999 | Kobayashi et al. |
| 6,791,207 B2 * | 9/2004 | Yoshida ............ B60R 16/0315 307/10.6 |

(Continued)

FOREIGN PATENT DOCUMENTS

| JP | 2000-016200 A | 1/2000 |
| JP | 2003-226207 A | 8/2003 |

(Continued)

OTHER PUBLICATIONS

International Search Report dated Nov. 5, 2019 for WO 2020/071007 A1 (4 pages).

*Primary Examiner* — Michael R. Fin
(74) *Attorney, Agent, or Firm* — Venjuris, P.C.

(57) ABSTRACT

A wiring system for an automobile includes: a first connection device connected to a corresponding one of electrical components so as to communicate with and supply power to the corresponding electrical component; and a plurality of second connection devices each connected to a corresponding one of the electrical components so as to communicate with and supply power to the corresponding electrical component, wherein a bus communication line sequentially passes through the first connection device and the plurality of second connection devices, and is branched so as to (Continued)

communicate with the electrical components in the first connection device and the plurality of second connection devices, and a plurality of power sources mounted in the automobile are connected to the first connection device and integrated, and electric power supplied from the plurality of power sources is distributed from the first connection device to the plurality of second connection devices.

10 Claims, 4 Drawing Sheets

(58) Field of Classification Search
USPC .................................................... 307/10.1
See application file for complete search history.

(56) References Cited

U.S. PATENT DOCUMENTS

| 10,300,867 | B2 | 5/2019 | Shiratori et al. |
| 2003/0001434 | A1* | 1/2003 | Saito ................. F16F 15/02 |
| | | | 307/10.1 |
| 2016/0059708 | A1 | 3/2016 | Iwasaki et al. |
| 2018/0308639 | A1* | 10/2018 | Ikegaya ................. H01G 4/018 |
| 2019/0123937 | A1 | 4/2019 | Takamatsu et al. |
| 2020/0215962 | A1* | 7/2020 | Brower ................. H04L 12/417 |

FOREIGN PATENT DOCUMENTS

| JP | 2012-076630 A | 4/2012 |
| JP | 2016-110811 A | 6/2016 |
| JP | 2016-147558 A | 8/2016 |

* cited by examiner

WIRING SYSTEM FOR AUTOMOBILE

CROSS REFERENCE TO RELATED APPLICATIONS

This application is a national phase of PCT application No. PCT/JP2019/033331, filed on 26 Aug. 2019, which claims priority from Japanese patent application No. 2018-188545, filed on 3 Oct. 2018, all of which are incorporated herein by reference.

TECHNICAL FIELD

The present disclosure relates to a wiring system for an automobile.

BACKGROUND

Patent Document 1 discloses a wire harness including: a main line portion in which a plurality of power supply wires are bundled; a main line intermediate distribution portion that is interposed in the main line portion between the two ends of the main line portion and to which a battery mounted in the vehicle and storing electric power is connected; and a pair of main line end portion distribution portions that are respectively connected to the two ends of the main line portion and distribute electric power supplied from the power storage device to connected devices. In this wire harness, another battery is also connected to one of the pair of main line end portion distribution portions.

PRIOR ART DOCUMENT

Patent Document

Patent Document 1: JP 2018-001860A

SUMMARY OF THE INVENTION

Problems to be Solved

Examples of automobiles include an internal combustion engine automobile including an internal combustion engine as a power source, an electric automobile including an electric motor as a power source, and a hybrid automobile including both an internal combustion engine and an electric motor. Each of these automobiles may employ a different power supply system.

However, in the technology disclosed in Patent Document 1, a battery is connected to the main line intermediate distribution portion, and the other battery is also connected to one of the pair of main line end portion distribution portions. Accordingly, if the power supply system is different, the entire design of the wire harness needs to be changed.

Therefore, an object of the present disclosure is to increase versatility of a wiring system for an automobile as much as possible.

Means to Solve the Problem

A wiring system for an automobile according to the present disclosure is a wiring system for an automobile mounted on an automobile in which a plurality of electrical components are incorporated, the wiring system including: a first connection device connected to a corresponding one of the electrical components so as to be able to communicate with and supply power to the corresponding electrical component; and a plurality of second connection devices connected to a corresponding one of the electrical components so as to able to communicate with and supply power to the corresponding electrical component, wherein a bus communication line sequentially passes through the first connection device and the plurality of second connection devices, and is branched so as to be able to communicate with the corresponding electrical components in the first connection device and the plurality of second connection devices, and a plurality of power sources mounted on the automobile are connected to the first connection device and integrated, and electric power supplied from the plurality of power sources is distributed from the first connection device to the plurality of second connection devices.

Effect of the Invention

According to the present disclosure, the versatility of the wiring system for an automobile is increased as much as possible.

DETAILED DESCRIPTION TO EXECUTE THE INVENTION

Description of Embodiments of the Present Disclosure

First, embodiments of the present disclosure will be listed and described.

A wiring system for an automobile of the present disclosure is as follows.

(1) A wiring system for an automobile mounted in an automobile in which a plurality of electrical components are incorporated, the wiring system including: a first connection device connected to a corresponding one of the electrical components so as to be able to communicate with and supply power to the corresponding electrical component; and a plurality of second connection devices each connected to a corresponding one of the electrical components so as to be able to communicate with and supply power to the corresponding electrical component, wherein a bus communication line sequentially passes through the first connection device and the plurality of second connection devices, and is branched so as to be able to communicate with the electrical components in the first connection device and the plurality of second connection devices, and a plurality of power sources mounted in the automobile are connected to the first connection device and integrated, and electric power supplied from the plurality of power sources is distributed from the first connection device to the plurality of second connection devices.

With this configuration, even when the power supply system mounted on the automobile is different, if the configuration for connecting the first connection device and the power source is changed, most of the other parts of the wiring system for an automobile can be used as they are. The bus communication line sequentially passes through the first connection device and the plurality of second connection devices, and is branched so as to be able to communicate with the electrical components in the first connection device and the plurality of second connection devices. With this configuration, even if the electrical component connected to the first connection device and the second connection devices is changed, the electrical components connected to the first connection device and the second connection devices can communicate with each other through the bus communication line. As a result, the versatility of the wiring system for an automobile is increased as much as possible.

(2) The wiring system for an automobile may also further include a gateway device connected to one end of the bus communication line. In this case, another electrical component having a different communication protocol can be communicably connected to the electrical component via the gateway device.

(3) At least one of the first connection device and the plurality of second connection devices may also be connected to the corresponding electrical component via a common connector so as to be able to supply power to and communicate with the corresponding electrical component. In this case, it is possible to easily handle a change in the electrical component connected to at least one connection device among the first connection device and the plurality of second connection devices.

(4) At least one wiring portion provided between the first connection device and one of the second connection devices or between the plurality of second connection devices in the bus communication line and at least one internal wiring part of the first connection device and the plurality of second connection devices may also be connected to each other via a connector. In this case, the wiring system can be easily incorporated into an automobile.

(5) At least one power supply wiring portion provided between the first connection device and the plurality of second connection devices may also be physically connected to at least one of the first connection device and the plurality of second connection devices from a state of being separated therefrom. In this case, the wiring system can be easily incorporated into an automobile.

(6) A plurality of power supply wiring portions provided between the first connection device and the plurality of second connection devices may also include a power supply wiring portions having a different conductor cross-sectional area. In this case, the power supply wiring portion having an appropriate conductor cross-sectional area can be selectively used according to a current desired for each of the plurality of second connection devices.

(7) The first connection device may also be provided with overcurrent breaking units in one-to-one correspondence with the plurality of second connection devices. In this case, the first connection device can easily handle overcurrent breaking.

(8) The first connection device may also be disposed in a front room on a front side of a vehicle cabin of the automobile, and the plurality of second connection devices may also include second connection devices provided on left and right sides in the vehicle cabin of the automobile. In this case, the wiring system is suitable for connecting the power source disposed in the front room to the electrical components provided on the left and right sides in the vehicle cabin of the automobile. Further, the wiring system is suitable for connecting the electrical component provided in the front room and the electrical components provided on the left and right sides in the vehicle cabin so that they can communicate with each other.

Detailed Description of Embodiments of the Present Disclosure

Specific examples of a wiring system for an automobile of the present disclosure will be described below with reference to the drawings. Note that the present disclosure is not limited to these examples, and is indicated by the scope of claims, and is intended to include all modifications within the meaning and scope equivalent to the scope of claims.

EMBODIMENTS

Figure 1:
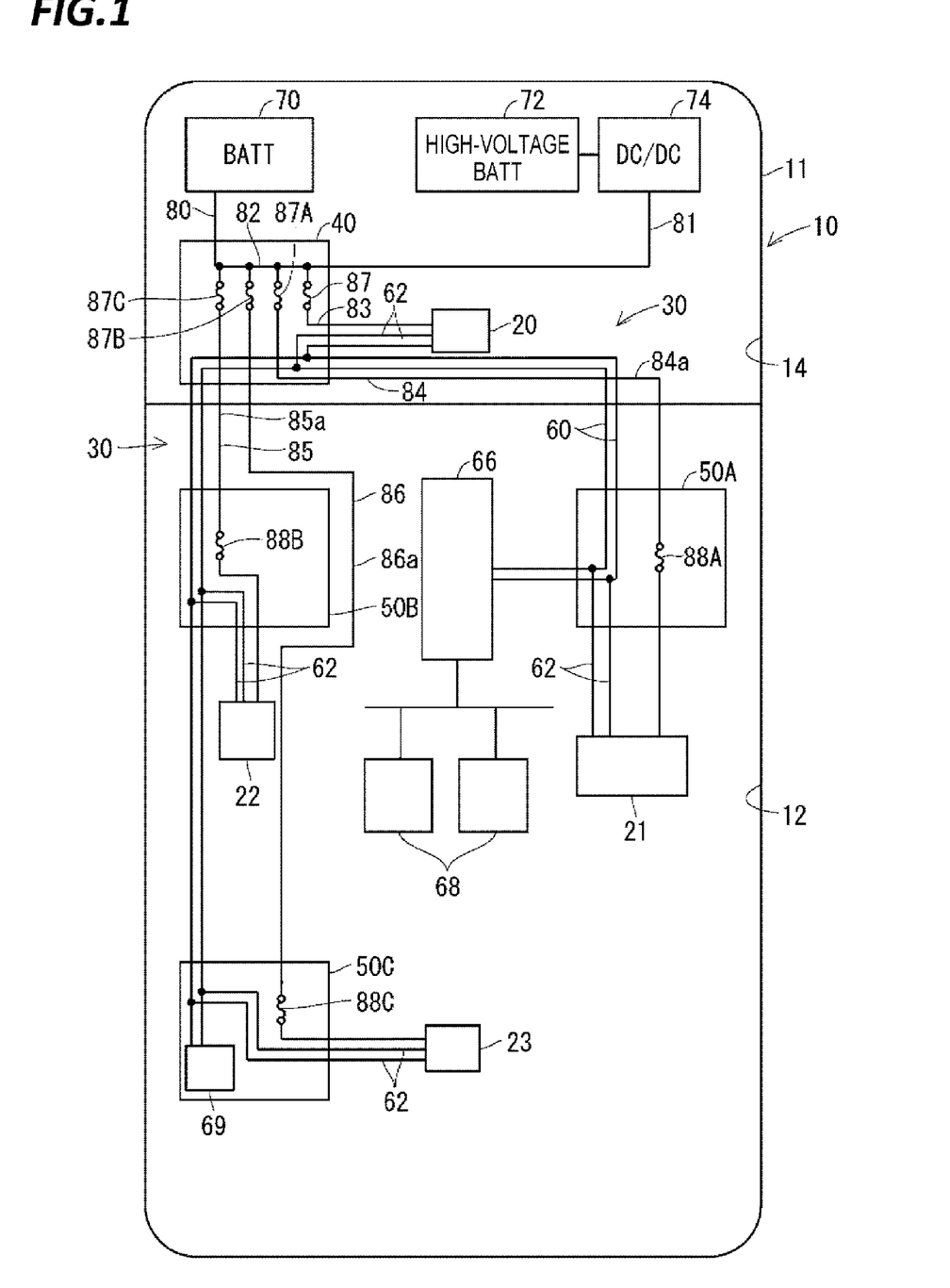
FIG. 1 is a block diagram showing a wiring system for an automobile according to an embodiment.

Hereinafter, a wiring system 30 for an automobile according to the embodiment will be described. FIG. 1 is a block diagram showing the wiring system 30 for an automobile.

The wiring system 30 for an automobile is mounted in an automobile 10 in which a plurality of electrical components 20, 21, 22, and 23 are incorporated. Here, in the automobile 10, an internal space of a body 11 is partitioned into a vehicle cabin 12 and a front room 14. The vehicle cabin 12 is a space for accommodating occupants and a space for accommodating luggage. The front room 14 is a space located in front of the vehicle cabin 12. If the automobile 10 is an automobile driven by an internal combustion engine, the front room 14 is an engine room. If the automobile 10 is an automobile driven by an electric motor, the front room 14 is a motor room. If the automobile 10 is an automobile driven by an internal combustion engine and an electric motor, the front room 14 is an engine and motor room.

The electrical components 20, 21, 22, and 23 include actuators such as sensors, switches, and motors, lighting devices, heaters, ECUs (electronic control units) and the like. The electrical components 20, 21, 22, and 23 are disposed in a distributed manner in different parts of the automobile. Here, it is assumed that the electrical component 20 is disposed in the front room 14, the electrical component 21 is disposed on the right front side in the vehicle cabin 12, the electrical component 22 is disposed on the left front side in the vehicle cabin 12, and the electrical component 23 is disposed on the rear side in the vehicle cabin 12.

The wiring system 30 for an automobile includes a first connection device 40 and a plurality of second connection devices 50A, 50B, and 50C.

The first connection device 40 is connected to the electrical component 20 so as to be able to communicate with and supply power to the electrical component 20. Here, the first connection device 40 is disposed in the front room 14, and is connected to the electrical component 20 disposed mainly in the front room 14 so as to be able to communicate with and supply power to the electrical component 20.

The plurality of second connection devices 50A, 50B and 50C are respectively connected to the electrical components 21, 22, and 23 so as to be able to communicate with and supply power to the electrical components 21, 22, and 23. Here, the plurality of second connection devices 50A, 50B, and 50C are disposed in the vehicle cabin 12, and are respectively connected to the electrical components 21, 22, and 23 disposed mainly in the vehicle cabin 12 so as to be able to communicate with and supply power to the electrical components 21, 22, and 23.

To be more specific, the second connection device 50A is disposed on the right front side of the vehicle cabin 12, and is connected to the electrical component 21 disposed mainly on the right front side of the vehicle cabin 12 so as to be able to communicate with and supply power to the electrical component 21. The second connection device 50B is disposed on the left front side of the vehicle cabin 12, and is connected to the electrical component 22 disposed mainly on the left front side of the vehicle cabin 12 so as to be able to communicate with and supply power to the electrical component 22. The second connection device 50C is disposed on the rear side of the vehicle cabin 12, and is connected to the electrical component 23 disposed mainly on the rear side of the vehicle cabin 12 so as to be able to communicate with and supply power to the electrical component 23.

That is, the automobile 10 is divided into a plurality of areas, and the first connection device 40 and the plurality of second connection devices 50A, 50B, and 50C are disposed for each area. The electrical components 20, 21, 22, and 23 in each area are connected to the first connection device 40 or the second connection devices 50A, 50B, and 50C disposed in the corresponding area.

The wiring system 30 for an automobile includes a bus communication line 60 for mutual communication between the first connection device 40 and the plurality of second connection devices 50A, 50B, and 50C. The bus communication line 60 is provided so as to sequentially pass through the first connection device 40 and the plurality of second connection devices 50A, 50B, and 50C. In other words, the first connection device 40 and the plurality of second connection devices 50A, 50B, and 50C are connected and linked together by the bus communication line 60. To be more specific, the bus communication line 60 is a communication line that transmits a signal according to a multiplex communication protocol such as a CAN (Controller Area Network) or an LIN (Local Interconnect Network), and is constituted by, for example, a twisted pair wire. The bus communication line 60 is arranged from one of the first connection device 40 and the plurality of second connection devices 50A, 50B, and 50C to the other connection devices so as to pass through the remaining connection devices. Accordingly, the first connection device 40 and the plurality of second connection devices 50A, 50B, and 50C are connected so as to be able to communicate with each other via the one bus communication line 60 as a whole. Here, the bus communication line 60 is arranged so as to extend from the second connection device 50A to the second connection device 50C via the first connection device 40 and the second connection device 50B.

When a plurality of multiplex communication protocols are employed in the wiring system 30 for an automobile, the wiring system 30 for an automobile may also include a plurality of bus communication lines 60 as described above in accordance with each multiplex communication protocol.

The bus communication line 60 is branched so as to be able to communicate with the electrical components 20, 21, 22, and 23 in the first connection device 40 and the plurality of second connection devices 50A, 50B, and 50C. Here, the bus communication line 60 is branched at each of the first connection device 40 and the plurality of second connection devices 50A, 50B, and 50C, and branch lines 62 are led out from the first connection device 40 and the plurality of second connection devices 50A, 50B, and 50C to the outside and are connected to the electrical components 20, 21, 22, and 23. Accordingly, the electrical components 20, 21, 22, and 23 are bus-connected to the bus communication line 60 in any one of the first connection device 40 and the plurality of second connection devices 50A, 50B, and 50C. Because the bus communication line 60 is a communication line for transmitting signals according to a multiplex communication protocol, the electrical components 20, 21, 22, and 23 are connected to each other via the bus communication line 60 so as to be able to communicate with each other.

A gateway device 66 is connected to the bus communication line 60. Other electrical components 68 communicating in other communication protocols may be connected to the bus communication line 60 through the gateway device 66. Examples of the other electrical components 68 connected to the gateway device 66 include a display device and a switch provided in an instrument panel.

Here, the gateway device 66 is connected to one end portion of the bus communication line 60 on the second connection device 50A side, and also serves as a terminal resistor. The gateway device 66 is connected to one end of the bus communication line 60. Accordingly, when the other electrical components are changed, the connection configuration between the gateway device 66 on one end side of the bus communication line 60 and the electrical components 68 can be easily changed without changing the wiring between the connection devices 40 and 50 in the bus communication line 60.

A terminal resistor 69 is connected to an end portion of the bus communication line 60 on the second connection device 50C side. The terminal resistor 69 may be provided inside the second connection device 50C, or may also be provided outside the second connection device 50C.

A plurality of power sources 70 and 72 are mounted in the automobile 10. Here, it is assumed that the automobile 10 is an electric automobile, and batteries 70 and 72 of two types of voltages are mounted as the plurality of power sources 70 and 72. The voltage of the battery 70 is lower than the voltage of the battery 72. The battery 70 is a low-voltage battery also referred to as an auxiliary battery, and supplies a voltage of 5V to 59V, for example. The battery 72 is a power source that supplies a voltage suitable for driving an electric motor for driving the automobile 10, and is a high-voltage battery that supplies a voltage of 90V to 500V, for example.

The batteries 70 and 72 are connected to the first connection device 40 and integrated. Preferably, all power sources mounted in the automobile 10 are connected to the first connection device 40.

Because the battery 70 supplies a low voltage, the battery 70 is directly connected to the first connection device 40. The battery 70 is connected to the first connection device 40 via an electric wire, a connector, or the like.

The battery 72 is connected to the first connection device 40 via a DC-DC converter 74. The DC-DC converter 74 converts a high voltage of the battery 72 into a low voltage of 5V to 59V in accordance with the voltage of the battery 70. The battery 72 is connected to the first connection device 40 via an electric wire, a connector, or the like.

A power supply line 80 from the battery 70 and a power supply line 81 from the battery 72 via the DC-DC converter 74 are connected to a common power supply line 82 in the first connection device 40 and integrated into one power supply line. Because the power supply lines 80 and 81 can be wired without being extended along other communication lines, the power supply lines 80 and 81 can be easily disposed on a route away from a driver's seat, a passenger's seat, and the like.

Electric power supplied from the plurality of batteries 70 and 72 is distributed from the first connection device 40 to each of the plurality of second connection devices 50A, 50B, and 50C.

That is, the common power supply line 82 is branched into a power supply line for the first connection device 40 and power supply lines for the plurality of second connection devices 50A, 50B, and 50C in the first connection device 40. Here, the common power supply line 82 is branched into four branch power supply lines 83, 84, 85, and 86.

The branch power supply line 83 is led out from the first connection device 40 to the outside, and is connected to the electrical component 20 that is connected to the first connection device 40. With this configuration, power is supplied to the electrical component 20. The branch power supply line 83 may also be directly led to the outside from the first connection device 40 and connected to the electrical component 20. The branch power supply line 83 may also be divided into a wiring part inside the first connection device 40 and a wiring part connecting the outside of the first connection device 40 and the electrical component 20, and both of them may also be connected by a connector.

The branch power supply line 84 is led out from the first connection device 40 to the outside, passes through the space in the automobile 10, and is introduced into the second connection device 50A. The branch power supply line 84 is led out from the inside of the second connection device 50A to the outside, and is connected to the electrical component 21 connected to the second connection device 50A. With this configuration, power is supplied to the electrical component 21. When a plurality of electrical components 21 are connected in the second connection device 50A, the branch power supply line 84 is branched in the second connection device 50A, then led out of the second connection device 50A, and connected to the electrical components 21. With this configuration, power can be supplied to the plurality of electrical components 21 connected to the second connection device 50A.

The branch power supply line 84 may also be constituted by one continuous conductive path. The branch power supply line 84 may also be divided into a wiring part in the first connection device 40, a wiring part in the second connection device 50A, and a wiring part laid in the automobile between the wiring portions, and these wiring portions may also be connected by connectors.

The branch power supply lines 85 and 86 are led out from the first connection device 40 to the outside, pass through the space in the automobile 10, and are led into the second connection devices 50B and 50C, respectively. The branch power supply lines 85 and 86 are connected to the electrical components 22 and 23 connected to the second connection devices 50B and 50C, respectively, in the same configuration as the branch power supply line 84 in the second connection device 50A.

When any of the electrical component 20 connected to the first connection device 40 and the electrical components 21, 22, and 23 connected to the second connection devices 50A, 50B, and 50C is to be driven by a voltage different from the voltage of the battery 70 (or the voltage after transformation by the DC-DC converter 74), a transformer may be incorporated in the first connection device 40 and the voltage after transformation may also be supplied through any one of the branch power supply lines 83, 84, 85, and 86.

When portions of the respective branch power supply lines 84, 85, and 86 provided between the first connection device 40 and the plurality of second connection devices 50A, 50B, and 50C are power supply wiring portions 84a, 85a, and 86a, the plurality of power supply wiring portions 84a, 85a, and 86a include the power supply wiring portions having different conductor cross-sectional areas (cross-sections orthogonal to the extending direction). Here, the plurality of power supply wiring portions 84a, 85a, and 86a are formed to have different conductor cross-sectional areas. The conductor cross-sectional areas of the plurality of power supply wiring portions 84a, 85a, and 86a are set in accordance with currents flowing in accordance with the electrical components 21, 22, and 23 respectively connected to the second connection devices 50A, 50B, and 50C. The conductor cross-sectional areas of the power supply wiring portions 84a, 85a, and 86a are smaller than the conductor cross-sectional areas of the power supply lines 80 and 81 that connect the first connection device 40 and the batteries 70 and 72.

The first connection device 40 is provided with overcurrent breaking units 87A, 87B, and 87C in one-to-one correspondence with the plurality of second connection devices 50A, 50B, and 50C. The overcurrent breaking units 87A, 87B, and 87C break the power supply line when an excessive current flows. Here, in the first connection device 40, the overcurrent breaking unit 87A is interposed in the branch power supply line 84, the overcurrent breaking unit 87B is interposed in the branch power supply line 85, and the overcurrent breaking unit 87C is interposed in the branch power supply line 86.

The first connection device 40 is provided with an overcurrent breaking unit 87 corresponding to the electrical component 20 connected to the first connection device 40. The overcurrent breaking unit 87 is interposed in the branch power supply line 83.

It is assumed that the overcurrent breaking units 87, 87A, 87B, and 87C are fuses. Each of the overcurrent breaking units 87, 87A, 87B, and 87C may also be constituted by a combination of a current sensor and a semiconductor switch that is controlled so as to switch on and off based on an output of the current sensor.

Here, the overcurrent breaking units 88A, 88B, and 88C are also provided in the second connection devices 50A, 50B, and 50C, respectively. The overcurrent breaking units 88A, 88B, and 88C are interposed in the branch power supply lines 84, 85, and 86 in the second connection device 50A, 50B, and 50C, respectively.

Note that the ground connection in the wiring system 30 for an automobile may be performed via the body, or may also be performed by extending a ground wire along the branch power supply lines 84, 85, and 86.

Figure 2:
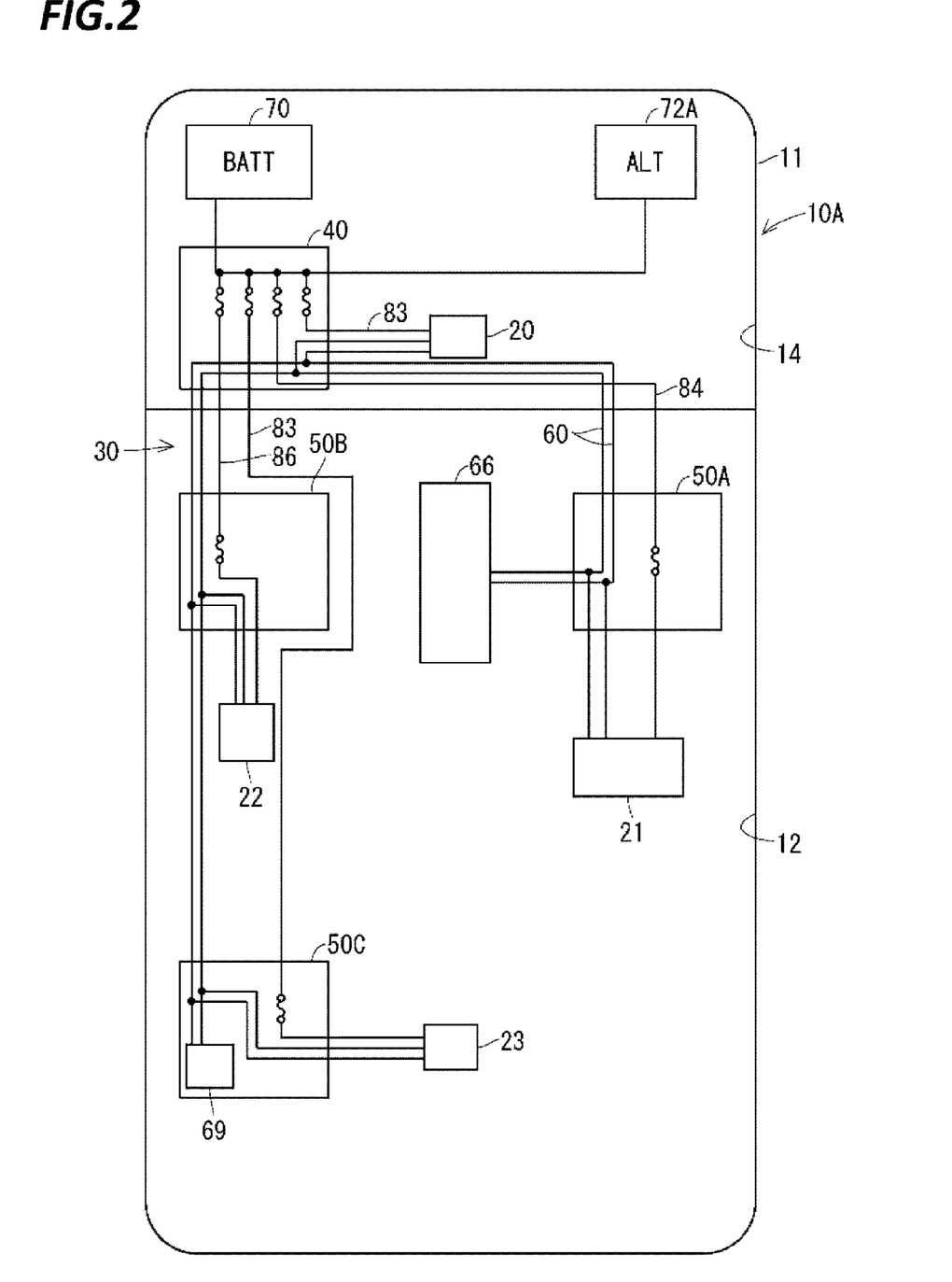
FIG. 2 is a block diagram showing the wiring system for an automobile in a case where a power supply system is different.

According to the wiring system 30 for an automobile configured as described above, even when the power supply system mounted in the automobile 10 is different, by changing the configuration for connecting the first connection device 40 and the plurality of power sources, most of the other parts of the wiring system 30 for an automobile can be used as they are. For example, it is assumed that the automobile is not an electric automobile 10 as shown in FIG. 1, but an automobile 10A that is driven by an internal combustion engine as shown in FIG. 2. In this case, it is assumed that a low-voltage battery 70 and an alternator 72A are mounted as the plurality of power sources in the automobile 10A. In this case, by changing the connection to the first connection device 40 so that the low-voltage battery 70 and the alternator 72A are connected to the first connection device 40, most of the wiring system 30 for an automobile can be used as it is. That is, the wiring system 30 for an automobile can be easily diverted without performing a change in the installation positions of the first connection device 40 and the plurality of second connection devices 50A, 50B, and 50C, a change in the wiring members therebetween, and a change in the wiring paths, and the like.

When the connection configuration between the plurality of power sources and the first connection device is changed, the first connection device 40 may be provided with various types of connectors capable of connecting power sources assumed in advance. The design of the first connection device 40 may also be changed according to the power source connected to the first connection device 40.

Figure 3:
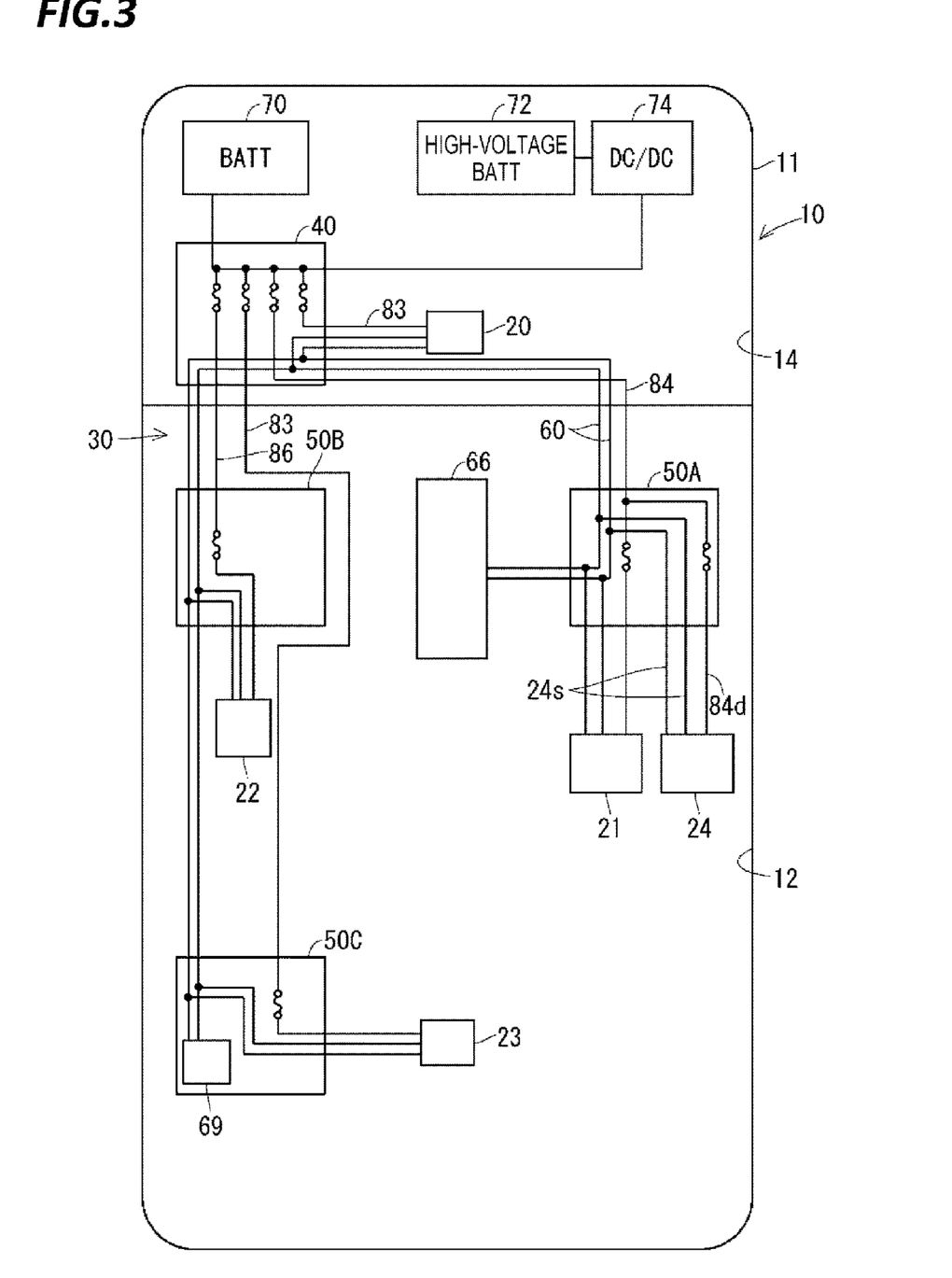
FIG. 3 is a block diagram showing the wiring system for an automobile in which an electrical component to be connected is changed.

The bus communication line 60 sequentially passes through the first connection device 40 and the plurality of second connection devices 50A, 50B, and 50C, and is branched so as to be able to communicate with the electrical components 20, 21, 22, and 23 in the first connection device 40 and the plurality of second connection devices 50A, 50B, and 50C. Accordingly, even if the electrical components 20, 21, 22, and 23 that are connected to the first connection device 40 and the second connection devices are to be changed, it is easy to handle the change. As shown in FIG. 3, for example, it is assumed that an additional electrical component 24 is connected to the second connection device 50A. In this case, communication lines 24s from the electrical component 24 are introduced into the second connection device 50A and bus-connected to the bus communication line 60. Because the bus communication line 60 performs communication in accordance with multiple communication protocols, the electrical component 24 is connected to the electrical components 20, 21, 22, and 23 through the bus communication line 60 so as to be able to communicate with the electrical components 20, 21, 22, and 23. The branch power supply line 84 is branched at the second connection device 50A to provide a secondary branch power supply line 84d, and the secondary branch power supply line 84d is connected to the electrical component 24, whereby power can be supplied to the electrical component 24.

As described above, in the case where the power supply systems are different, the case where the electrical components to be connected are different, or the like, it is possible to easily handle the case by designing a wiring system 30 for an automobile by re-using as much of the wiring system 30 for an automobile as possible, and it is possible to increase the versatility of the wiring system 30 for an automobile as much as possible.

The automobile 10 is divided into a plurality of areas, power is distributed from the first connection device 40 to the plurality of second connection devices 50A, 50B, and 50C for each area, and electrical components 21, 22, and 23 are connected to the first connection device 40 and the second connection devices 50A, 50B, and 50C for each area to enable mutual communication by multiplex communication. Therefore, the electrical design change of the automobile 10 may be considered in units of areas in many cases.

Because the gateway device 66 is connected to one end of the bus communication line 60, another electrical component 68 having a different communication protocol can be connected to the electrical components 20, 21, 22, and 23 via the gateway device 66 so as to be able to communicate with the electrical components 20, 21, 22, and 23. In the case of changing the gateway device 66 or changing the design of the wiring path or the like on the other communication protocol side, it is only necessary to change the design of the elements on the outer side with respect to the one end of the bus communication line 60, and a wiring system for an automobile can be easily designed by using the wiring system 30 for an automobile as-is. Also in this respect, the versatility of the wiring system 30 for an automobile can be enhanced.

The first connection device 40 is provided with overcurrent breaking units 87A, 87B, and 87C in one-to-one correspondence with the plurality of second connection devices 50A, 50B and 50C. Accordingly, the first connection device 40 can easily handle overcurrent breaking. For example, fuse replacement or the like can be easily handled in the first connection device 40.

The first connection device 40 is disposed in the front room 14 on the front side of the vehicle cabin 12 of the automobile 10. Accordingly, the first connection device 40 is suitable for connecting the power sources (the batteries 70 and 72) disposed in the front room 14 to the electrical components 21, 22, and 23 provided on the left and right sides in the vehicle cabin 12. Further, the first connection device 40 is suitable for connecting the electrical components 20 provided on the front room 14 and the electrical components 21, 22, and 23 provided on the left and right sides of the vehicle cabin 12 so that they can communicate with each other.

Because the second connection device 50A and 50B and the second connection device 50C are provided in the front and rear areas, the second connection device 50A and 50B and the second connection device 50C are suitable for connecting the electrical components 21 and 22 and the electrical component 23, which are provided separately in the front and rear areas, so as to be able to supply power to and communicate with the electrical components 21 and 22 and the electrical component 23.

Connections for communication between the first connection device 40 and the plurality of second connection devices 50A, 50B, and 50C and between the first connection device 40 and the plurality of second connection devices 50A, 50B, and 50C and the respective electrical components 20, 21, 22, and 23 are made via communication wires. The communication wires may be twisted pair electric wires or general electric wires.

Connections for power supply between the first connection device 40 and the batteries 70 and 72, between the first connection device 40 and the plurality of second connection devices 50A, 50B, and 50C, and between the first connection device 40 and the plurality of second connection devices 50A, 50B, and 50C and the respective electrical components 20, 21, 22, and 23 are made via power supply wires. The power supply wires may be general electric wires or power supply wires each including a strip-shaped conductive plate.

The above communication wires and the power supply wires may be guided into the first connection device 40 or the second connection devices 50A, 50B, and 50C as they are, and may also be branched inside the first connection device 40 or the second connection devices 50A, 50B, and SOC. The above communication wires or the power supply wires may be connected to the wirings inside the first connection device 40 or the second connection devices 50A, 50B, and 50C via connector connections.

Figure 4:
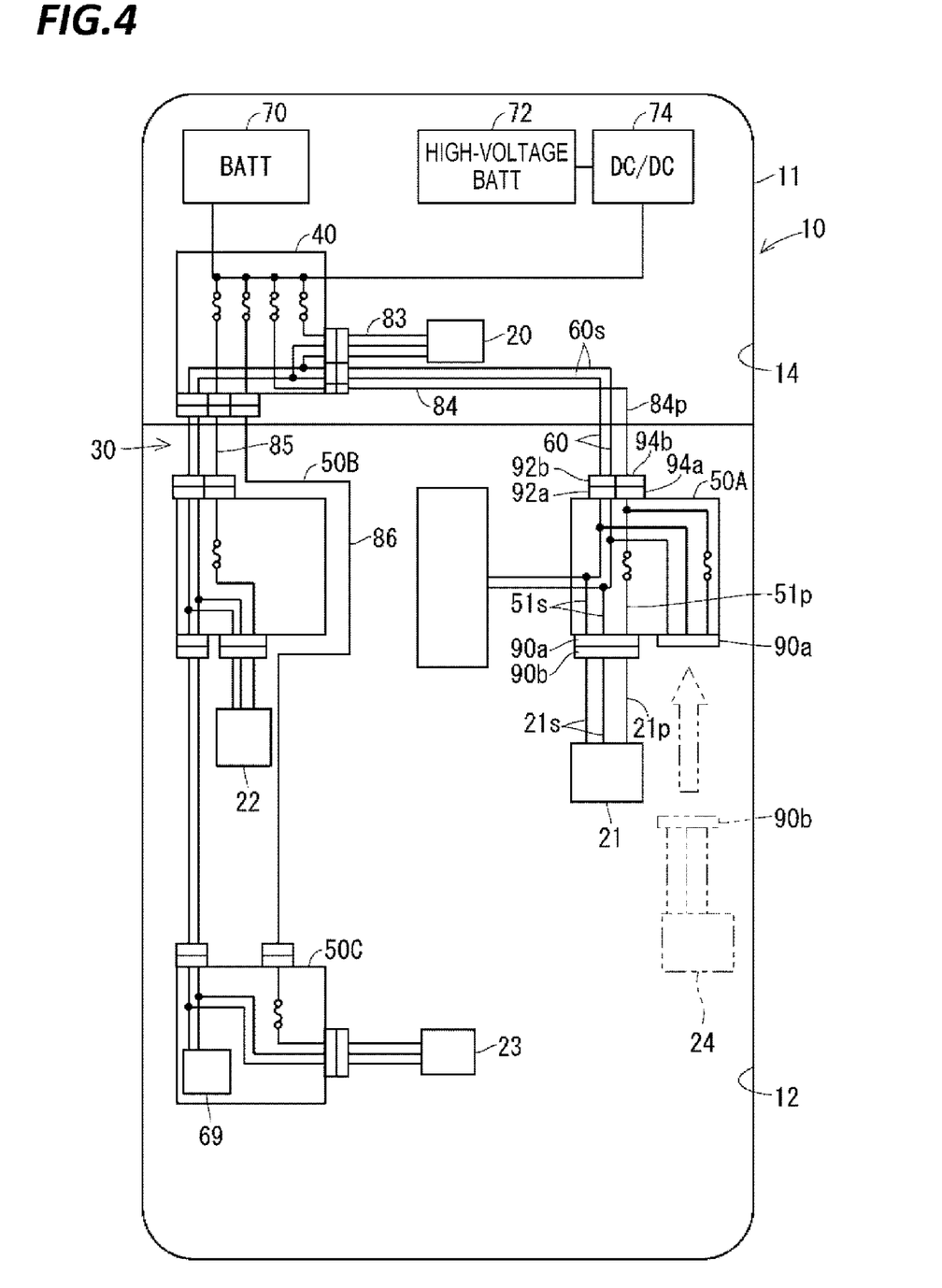
FIG. 4 is a block diagram showing the wiring system for an automobile to which connector connection is applied.

For example, as shown in FIG. 4, a configuration is disclosed in which at least one of the first connection device 40 and the plurality of second connection devices 50A, 50B, and 50C is connected to the electrical component 20, 21, 22, or 23 via common connectors 90a and 90b so as to be able to supply power to and communicate with the electrical component 20, 21, 22, or 23. For example, in the second connection device 50A, an internal wiring part 51p for power supply is connected to the terminal of the connector 90a. Also, in the second connection device 50A, internal wiring parts 51s for communication are connected to the terminal of the connector 90a. Further, a power wire 21p from the electrical component 21 is connected to the terminal of the connector 90b, and communication wires 21s from the electrical component 21 are connected to the terminal of the connector 90b. Then, by connecting the connectors 90a and 90b to each other via connectors, the second connection device 50A is connected to the electrical component 21 so as to be able to supply power and communicate with the electrical component 21. In FIG. 4, the electrical components 20, 22, and 23 are connected via connectors to the first connection device 40 and the second connection devices 50B and 50C, respectively.

With this configuration, it is possible to easily deal with the changing of the electrical component 20, 21, 22, or 23 with respect to at least one of the first connection device 40 and the plurality of second connection devices 50A, 50B, and 50C.

If a plurality of connectors 90a are provided in at least one of the first connection device 40 and the second connection devices 50A, 50B and 50C (see the second connection device 50A in FIG. 4), the electrical component 24 to be added later can be easily connected by connectors.

One wiring part provided between the first connection device 40 and the second connection devices 50A, 50B, and 50C or between the plurality of second connection devices 50A, 50B, and 50C in the bus communication line 60 (see, for example, the wiring parts 60s between the first connection device 40 and the second connection device 50A in FIG. 4) may be connected via connectors to at least one internal wiring part of the first connection device 40 and the second connection devices 50A, 50B, and 50C (see, for example, the internal wiring parts 51s of the first connection device 40). In FIG. 4, the terminal of the connector 92b is connected to the end portions of the wiring parts 60s, and the terminal of the connector 92a is connected to the end portions of the internal wiring parts 51s. Then, when the connectors 92a and 92b are connected to each other, the wiring parts 60s and the internal wiring parts 51s are connected to each other via connectors. FIG. 4 discloses an example in which internal wiring parts and external wiring parts are connected via connectors also in other portions of the bus communication line 60.

With this configuration, the wiring parts of the bus communication line 60 laid in the automobile, the first connection device 40, and the plurality of second connection devices 50A, 50B, and 50C can be separately incorporated, and thus the wiring system 30 for an automobile can be easily incorporated into the automobile 10.

Also, at least one power supply wiring portion provided between the first connection device 40 and the plurality of second connection devices 50A, 50B, and 50C (for example, see a power supply wiring part 84p between the first connection device 40 and the second connection device 50A in FIG. 4) and at least one internal wiring part of the first connection device 40 and the second connection devices 50A, 50B, and 50C (for example, see an internal wiring part 51p of the first connection device 40) may be physically connected to each other from a state of being separate from each other. That is, the power supply wiring part 84p and the internal wiring part 51p may be formed separately from each other, and may also be connected to each other after being manufactured, particularly after being attached to the automobile 10. In FIG. 4, the terminal of the connector 94b is connected to the end portion of the power supply wiring part 84p, and the terminal of the connector 94a is connected to the end portion of the internal wiring part 51p. Then, when the connectors 94a and 94b are connected to each other, the power supply wiring part 84p and the internal wiring part 51p are connected to each other via connectors. FIG. 4 discloses an example in which the internal wiring parts and the external wiring parts are connected via connectors also in other portions of the power supply line. The connections between the internal wiring parts and the external wiring parts may be made by another connection via a round terminal.

With this configuration, because the wiring parts of the power supply line laid in the automobile, the first connection device 40, and the plurality of second connection devices 50A, 50B, and 50C can be separately incorporated, the wiring system 30 for an automobile can be easily incorporated into the automobile 10.

The configurations described in the above embodiment and the modifications can be appropriately combined as long as they do not contradict each other.

LIST OF REFERENCE NUMERALS

10 Electric automobile
10A Automobile
11 Body
12 Vehicle cabin
14 Front room
20, 21, 22, 23, 24 Electrical component
21p Power supply wire
21s Communication wire
24s Communication line
30 Wiring system for an automobile
40 First connection device
50 Connection device
50A, 50B, 50C Second connection device
51p, 51s Internal wiring part
60 Bus communication line
60s Wiring part
62 Branch line
66 Gateway device
68 Electrical component
69 Terminal resistor
70 Low-voltage battery (power source)
72 Battery (power source)
72A Alternator
74 DC-DC converter
80, 81 Power supply line
82 Common power supply line
83, 84 Branch power supply line
84a Power supply wiring portion
84d Secondary branch power supply line
84a Power supply wiring part
85 Branch power supply line
85a Power supply wiring portion
86 Branch power supply line
86a Power supply wiring portion
87, 87A, 87B, 87C, 88A, 88B, 88C Overcurrent breaking unit
90a, 90b, 90p, 92a, 92b, 94a, 94b Connector

What is claimed is:

1. A wiring system for an automobile mounted in an automobile in which a plurality of electrical components are incorporated, comprising:
a first connection device connected to a corresponding one of the electrical components so as to be able to communicate with and supply power to the corresponding electrical component; and a plurality of second connection devices each connected to a corresponding one of the electrical components so as to be able to communicate with and supply power to the corresponding electrical component, wherein a common bus communication line sequentially passes through the first connection device and the plurality of second connection devices so as to pass from a part of the plurality of second connection devices, through the first connection device, and to the remaining parts of the plurality of second connection devices, and is branched so as to be able to communicate with the electrical components in the first connection device and the plurality of second connection devices, a plurality of power sources mounted in the automobile are connected to the first connection device and integrated, and electric power supplied from the plurality of power sources is distributed from the first connection device to the plurality of second connection devices, and the plurality of power sources are connected to a common power supply line in the first connection device, and the common power supply line is branched into a power supply line for the first connection device and a plurality of power supply lines for the plurality of second connection devices, respectively.

2. The wiring system for an automobile according to claim 1, further comprising a gateway device connected to one end of the bus communication line.

3. The wiring system for an automobile according to claim 1, at least one of the first connection device and the plurality of second connection devices is connected to the corresponding electrical component via a common connector so as to be able to supply power and communicate with the corresponding electrical component.

4. The wiring system for an automobile according to claim 1, wherein at least one wiring portion provided between the first connection device and one of the second connection devices or between the plurality of second connection devices in the bus communication line and at least one internal wiring part of the plurality of second connection devices are connected to each other via a connector.

5. The wiring system for an automobile according to claim 1, wherein at least one power supply wiring portion provided between the first connection device and the plurality of second connection devices is physically connected to at least one of the plurality of second connection devices from a state of being separated therefrom.

6. The wiring system for an automobile according to claim 1, wherein a plurality of power supply wiring portions provided between the first connection device and the plurality of second connection devices include a power supply wiring portion having a different conductor cross-sectional area.

7. The wiring system for an automobile according to claim 1, wherein the first connection device is provided with overcurrent breaking units in one-to one correspondence with the plurality of second connection devices.

8. The wiring system for an automobile according to claim 1, wherein the first connection device is disposed in a front room of the automobile on a front side of a vehicle cabin of the automobile, and the plurality of second connection devices include second connection devices provided on left and right sides in the vehicle cabin of the automobile.

9. The wiring system for an automobile according to claim 1, wherein the plurality of second connection devices include three or more of the second connection devices.

10. The wiring system for an automobile according to claim 1, wherein the plurality of second connection devices include a first second connection device and a second second connection device, the bus communication line sequentially passes from the first connection device through the first second connection device and the second second connection device, and the first connection device is connected to the first second connection device and the second second connection device via separate branch power supply lines.

* * * * *